United States Patent [19]

Franckx et al.

[11] Patent Number: 5,435,747
[45] Date of Patent: Jul. 25, 1995

[54] ELECTRICALLY-PROTECTED CONNECTOR

[75] Inventors: Joris I. Franckx, Bonheiden, Belgium; Reza Zadno, Newark, Calif.

[73] Assignee: N.V. Raychem S.A., Kessel-lo, Belgium

[21] Appl. No.: 108,600

[22] PCT Filed: Feb. 4, 1992

[86] PCT No.: PCT/GB92/00209
§ 371 Date: Aug. 23, 1993
§ 102(e) Date: Aug. 23, 1993

[87] PCT Pub. No.: WO92/15129
PCT Pub. Date: Sep. 3, 1992

[30] Foreign Application Priority Data

Feb. 25, 1991 [GB] United Kingdom ............... 9103902

[51] Int. Cl.⁶ .................................... H01R 13/02
[52] U.S. Cl. .................... 439/409; 439/488
[58] Field of Search ............ 439/409, 410, 404, 405, 439/488, 489, 490

[56] References Cited

U.S. PATENT DOCUMENTS 4,208,084 6/1980 Kali ........................... 439/409
4,333,701 6/1982 Schick ........................ 439/410
4,420,792 12/1983 Hegner et al. .
4,461,528 7/1984 Durand et al. ................ 439/409

FOREIGN PATENT DOCUMENTS 0204675 12/1986 European Pat. Off. .
0399628 11/1990 European Pat. Off. .
2115992 9/1983 United Kingdom .
2129630 5/1984 United Kingdom ................ 439/404
2176062 12/1986 United Kingdom .

Primary Examiner—Daniel W. Howell
Attorney, Agent, or Firm—Herbert G. Burkard; William D. Zahrt, II; A. Stephen Zavell

[57] ABSTRACT

An electrical connector, which comprises
(a) a housing comprising a first part and a second part that can be moved relative to one another,
(b) an electrical protection device carried by the first part and being electrically-connectable to a first electrical contact that extends within the housing,
(c) a second electrical contact within the housing that has means for connection thereto of an electrical conductor, the first and second electrical contacts being arranged such that connection is made between them on closing the housing and connection between them is broken on opening the housing.

11 Claims, 11 Drawing Sheets

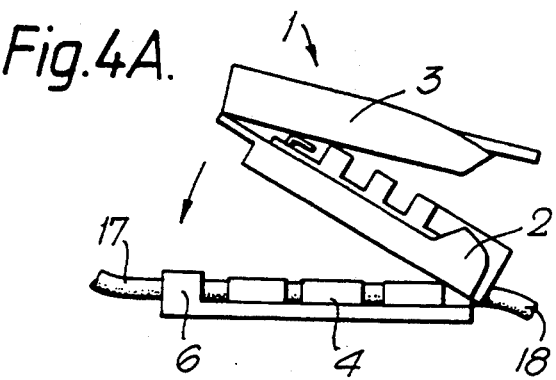
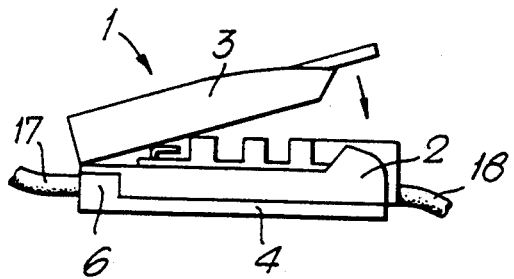
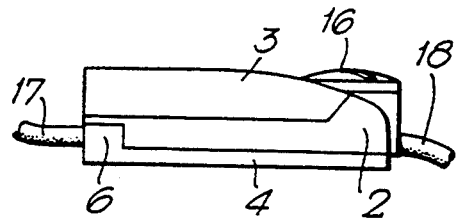
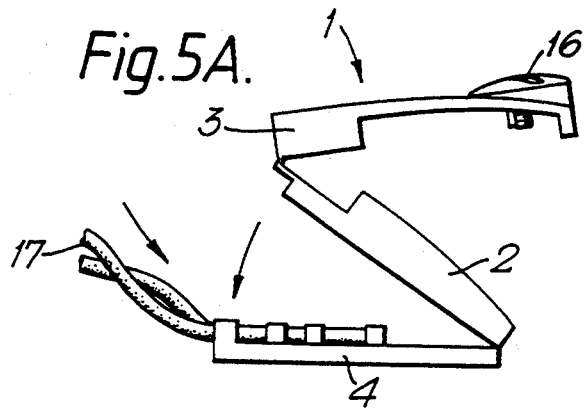
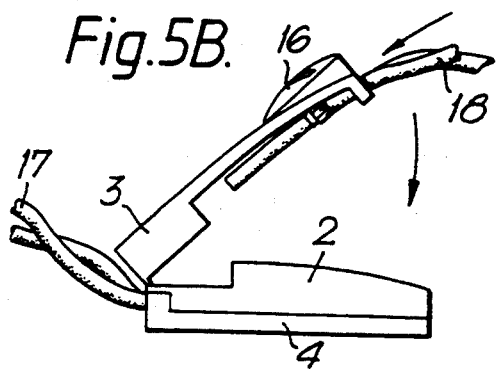
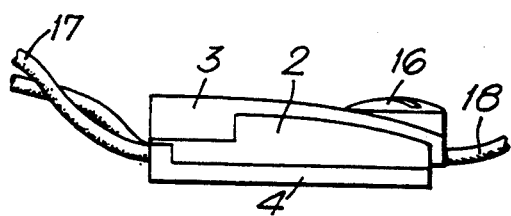

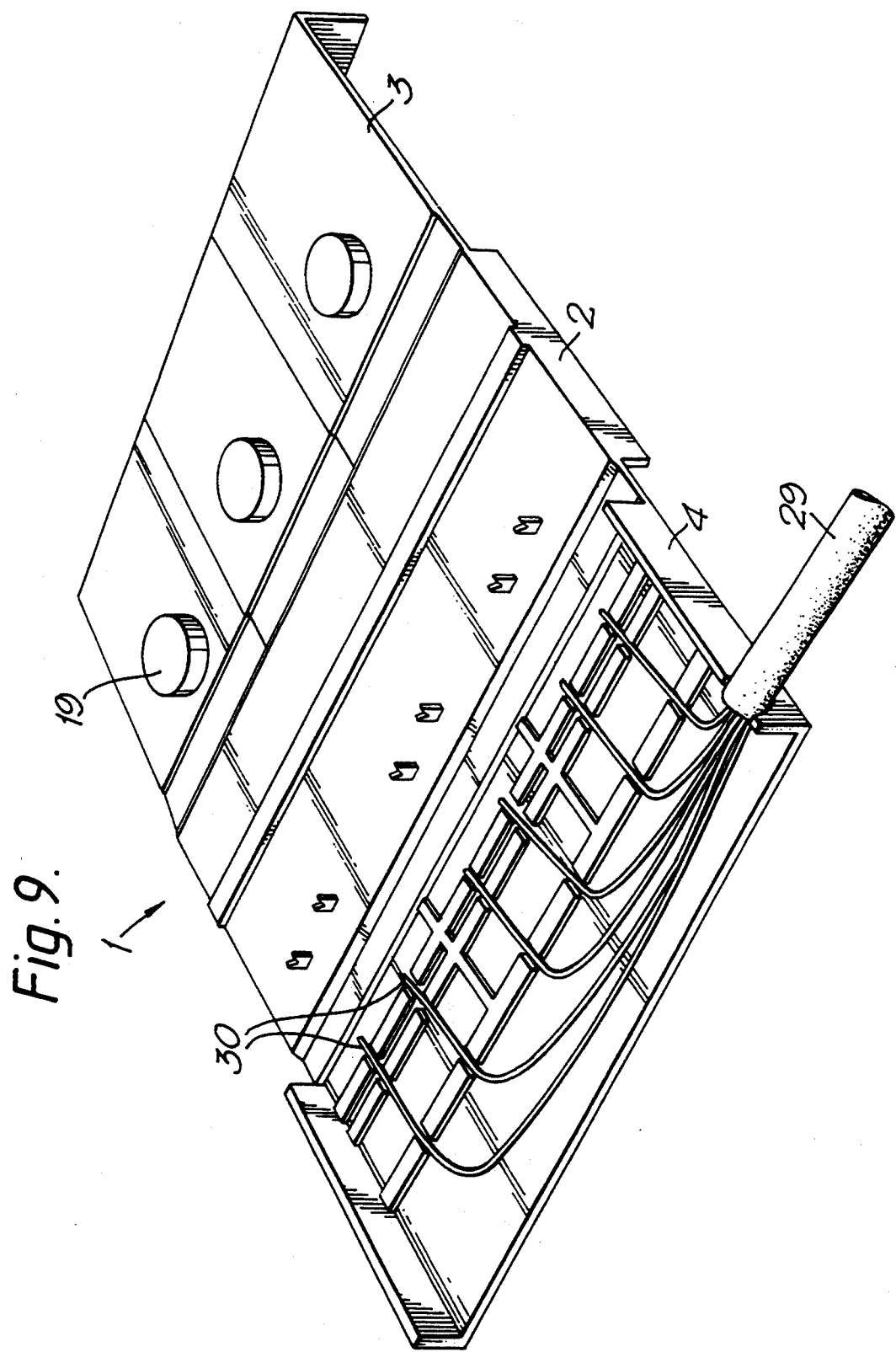

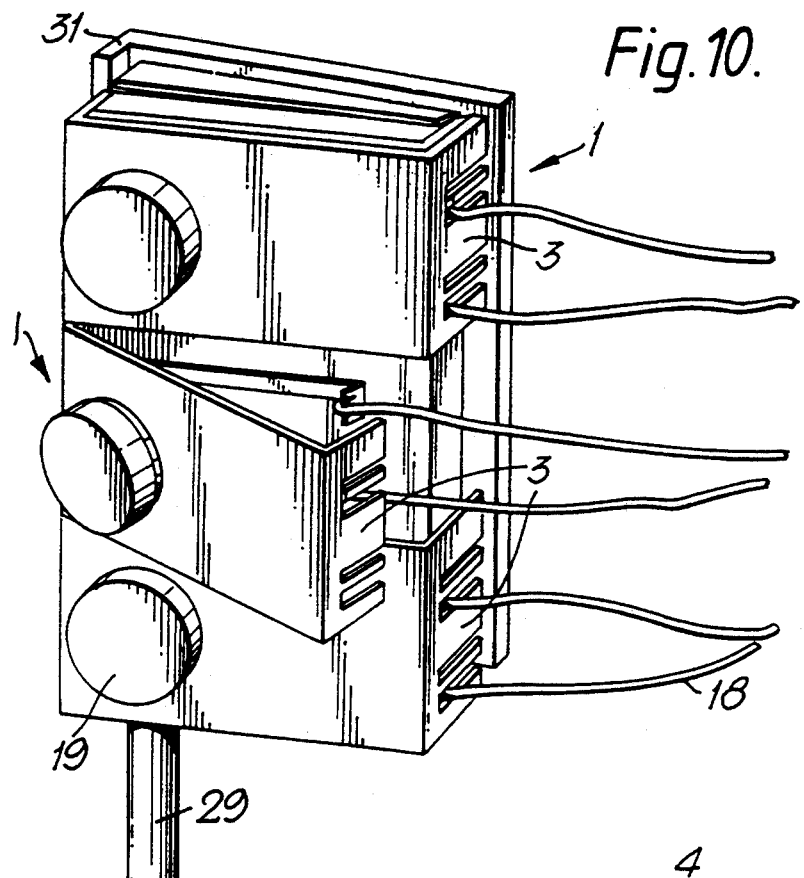
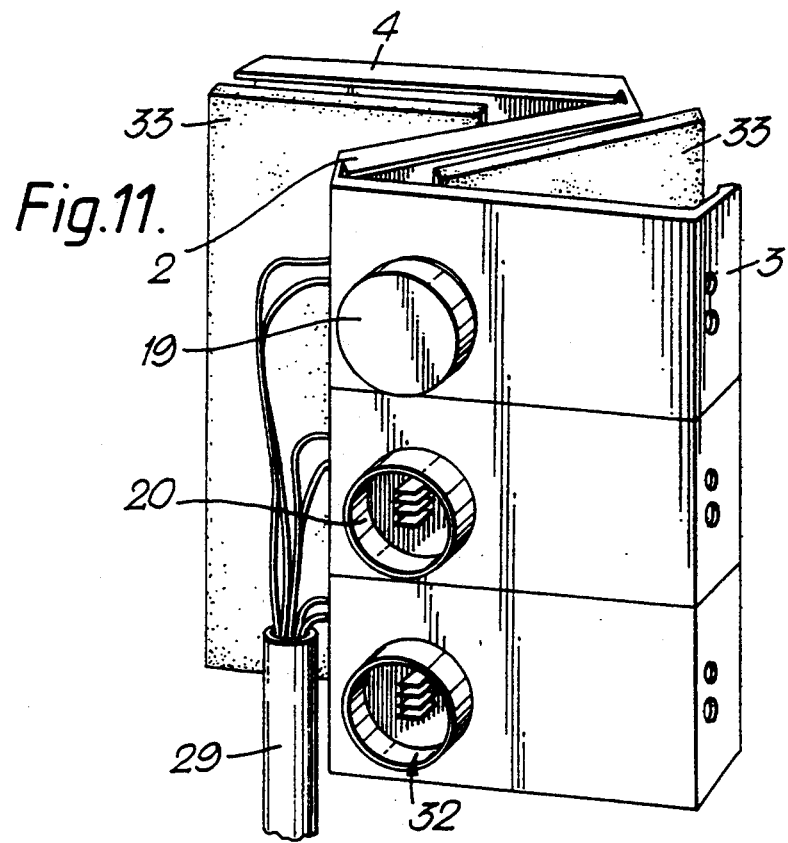

ELECTRICALLY-PROTECTED CONNECTOR

The present invention relates to an electrical connector, particularly one suitable for forming at least part of a telecommunications connector block, that is provided with electrical protection.

Connector blocks are used in telephone or other telecommunications systems as follows. A distribution cable containing, say, hundreds of pairs of conductors will leave a telephone central office and, perhaps after branching one or more times, will terminate in a small number of drop wires leading to subscribers. The branches will also end in drop wires to subscribers. These connections between the cable and a number of drop wires occur at a distribution point. Also, cables may need to be joined together in a way that allows their conductor interconnections to be rearranged. That occurs at a cross-connection point. Distribution points and cross-connection points may occur in ground level cabinets or pedestals, on a pole or suspended from a wire etc.

Rather than have a large number of loose connectors at a distribution or cross-connection point, it is normal to provide a terminal block or cross-connection block which can be used to connect a number of pairs, such as 3, 5, 10, 25 or 50. Terminal blocks will usually have incoming conductors permanently attached and outgoing conductors removable; and cross-connection blocks will usually have all conductors removable. The term "connector block" is used herein generically.

It is known that telecommunications lines are desirably provided with electrical protection, against for example lightning strike and mains voltage cross. In particular, so-called five-pin protectors can be used to provide over-current protection in series with each of the two conductors of each pair (sometimes referred to as tip and ring), and overvoltage protection between each conductor and ground.

Such a five-pin protector is disclosed in U.S. Pat. No. 4,733,325 (AT&T). Reference is made to a spark gap voltage protector, which generally includes a pair of spaced carbon electrodes or a gas discharge device. One of the electrodes is connected to an incoming telephone line and the other to ground. If a high voltage is impressed on the line it will bridge the gap between the electrodes and cause current to flow to ground, thus by-passing sensitive equipment that is associated with the line. Also mentioned are heat coils that include a high resistance wire which is wound on a metal sleeve inside of which a contact pin is held in a predetermined position by a fusible bonding material such as solder. Excessive currents on the telephone line cause heat to be generated in the coil to melt the solder and release the pin. Various other types of protection are also disclosed.

U.S. Pat. No. 4,741,711 (ADC Telecommunications) discloses a modular distribution frame which includes a module block having opposing rows of wire connectors having a wire terminating end and a spring contact finger end. The spring contact finger ends extend into apertures in the connector, as does an overload protector element. The protector element extends between opposing spring fingers to separate them, thus interposing between them circuitry of the protector element.

GB 2176062 (Egerton) discloses a terminal block including at least one pair of main contacts, an earth contact and a surge arrestor, the terminal block further comprising means operable automatically to connect the main contacts to earth when the surge arrestor is removed.

U.S. Pat. No. 4,617,602 (Siemens) discloses a protective element system including a distributor strip and a protective element pluggable into it. A grounding rail projects into receptacle chambers of the strip into which the element is plugged.

A plug-in connector with arrestors is disclosed in U.S. Pat. No. 4,420,792 (Krone). The connector has a cartridge-type housing having receptacles for the arrestors each of which is connected through a fuse and an earth contact to an earth strip.

A connector bank for telecommunications devices is disclosed in U.S. Pat. No. 4,822,306 (Krone). The bank has a series of contact elements for overvoltage suppressors formed in plug sockets.

U.S. Pat. No. 4,113,340 (Illinios Tool Works) discloses a compact electrical device for use with terminal blocks.

An improved telephone protector module for use with individual subscriber circuits is disclosed in U.S. Pat. No. 4,675,779 (Porta Systems). An inner end wall of the module is recessed to accommodate a sealing gasket which surrounds contact pins. The gasket, which provides a resilient seal to a surface of a protector block is formed of closed cell synthetic sponge rubber.

The disclosure of each of the above patents is incorporated herein by reference.

I have now designed an electrical connector, particularly for a connector block that incorporates electrical protection in a convenient way and allows easy access.

Thus, the invention provides an electrical connector, which comprises
  (a) a housing comprising a first pan and a second part that can be moved relative to one another;
  (b) an electrical protection device carried by the first part and being electrically-connectable to a first electrical contact that extents within (and preferably also extends into) the housing;
  (c) a second electrical contact within the housing that has means for connection thereto of an electrical conductor (such as a wire from a cable or a drop wire to a subscriber);
the first and second electrical contacts being arranged such that connection is made between them on closing the housing and connection between them is broken on opening the housing.

The electrical protection device may comprise an overvoltage and/or overcurrent or other protector. For example it may comprise an overvoltage protector, connected between said first contact and an electrical ground of the connector. It may also or alternatively be connectable to a third electrical contact that extends within (and preferably into) the housing and that has means (such as an IDC) for connection thereto of an electrical conductor. In that case the device preferably connects the first and third contacts via an overcurrent protector, and I prefer that positioning of the protection device at the first part breaks a direct electrical connection between the first and third contacts.

The invention also provides an electrical connector, which comprises:
  (a) a housing that has means for receiving an electrical protection device;
  (b) a first electrical contact having means for connection to a first electrical conductor;

(c) a second electrical contact having means for connection to a second electrical conductor, and being capable of being in direct electrical contact with the first contact in the absence of the protection device;

(d) the protection device, which when received in the housing interposes an overcurrent protector between the first and second contacts; and (e) optionally an electrical ground;

the protection device, when received in the housing, interposing an overvoltage protector between the first and/or second contacts and the ground.

Any suitable overvoltage and/or overcurrent or other protector may be used, for example any one or more of those disclosed in the above patents may be chosen. Solid state devices and conductive-polymer switches may also be used.

The means for connection to a conductor may comprise an insulation-displacement connector, particularly of the split-beam type. It may be operative when the housing is closed, for example in the sense that closing of the housing forces the conductor into the IDC, and opening of the housing releases it. It may be preferred, however, that the IDC connection is not made and broken each time the housing is open. This is especially the case as regards access to subscriber drop wires, which is likely to be required more often than access to connections to the cable to central office. Thus, it is preferred that the housing be openable with the subscriber drop remaining in its IDC, the electrical connection being broken, if necessary, elsewhere.

The connector of the invention preferably comprises three (or more), preferably substantially planar, parts that are pivotable together. Preferably they are integral and joined by living hinges. I prefer that the three parts in cross-section (if pivotally moved to be partially open) have substantially the configuration of a letter Z. This is to be regarded as a description of the topology of the parts, and it is not necessary that pivoting be possible to such an extent. Wide opening of one or both pairs of parts is however preferred. The base of the Z, for example, could be mounted on a casing and a conductor from central office connected to an internal IDC etc between the base and the oblique limb of the Z. A subscriber drop could then be connected to an IDC between the top and the oblique limb of the Z. Closing the Z connects the IDCs together, and also connects them to a protection device mounted for example on the top of the Z.

The invention may additionally or alternatively provide one or more of the following.

An electrical connector having a housing, comprising:

(a) a first part, (b) a second part pivotable about a first line to open and close a space between the first and second parts, and (c) a third part pivotable about a second line of the first part optionally to open and close a space between the first and third parts.

A telecommunications connector block for connecting together first and second conductors, which comprises (i) a housing comprising
  (a) a hollow first part, and
  (b) a second part attached to the first part and which can be moved relative to the first part to open and close the housing, (ii) a switch within the housing, comprising
  (a) a first contact that can be connected to the first conductor, and
  (b) a second contact that can be connected to the second conductor, the parts and the contacts being so arranged that opening of the housing automatically opens the switch, and closing of the housing automatically closes the switch.

An electrical connector, which comprises (a) a first part having an electrical contact and means for locating an insulated conductor;

(b) a second part having a split-beam first insulation-displacement connector, the first and second parts being moveable relative to one another to open and close a space between them, such that on moving the first and second parts to close the space the insulation-displacement connector makes electrical contact with (i) an insulated conductor located in the means for locating, contact being made through insulation of the conductor and (ii) said electrical contact.

A split-beam electrical connector, in which the beams at the split are bent between proximal and distal ends thereof.

A split-beam insulation displacement connector having a configuration such that insertion of a conductor therein causes torsion of at least one the beam.

A resilient electrical connector into which a conductor may be inserted thereby deforming the connector against its resilience, a mode of deformation of the connector varying with extent of insertion.

An electrical connector having a housing, comprising:

(a) a first part, (b) a second part pivotable about a line adjacent a first a third part pivotable about a line adjacent a second edge of the first part optionally to open and close a space between the first and third parts; the second edge being adjacent or substantially opposite the first edge.

An electrical connector, comprising (a) a housing comprising a first hollow part and a second part, that can be moved relative to the first pan to open and close a space between the first and second parts, (b) an electrical switch within the housing that is arranged such that a connection is made automatically on closing said space, optionally when a conductor is located at the first or second part; and (c) a sealing material within the space that is substantially entirely enclosed when the space is closed.

An electrical connector which comprises (a) a housing comprising
  (i) a first part, and
  (ii) a second part moveable with respect to the first part to open and close the housing;

(b) a first electrical contact carried by the first part;

(c) a second electrical contact or means for locating a conductor carried by the second part, such that when the housing is closed electrical contact is capable of being made between the first contact and either the second contact or the conductor;

(d) electrical ground;

(e) means for moving the first and second parts to close the housing, which means is in electrical contact with the electrical ground.

For background information, reference may be made to U.S. Pat. No. 4,449,777, U.S. Pat. No. 4,435,034, U.S. Pat. No. 4,806,119, U.S. Pat. No. 4,193,201, U.S. Pat. No. 4,741,711, U.S. Pat. No. 4,295,703, U.S. Reexam certificate B1 3708779, U.S. Pat. No. 3,793,612, U.S. Pat. No. 4,759,723, U.S. Pat. No. 4,344,664, U.S. Pat. No. 3,950,063, U.S. Pat. No. 4,662,692, U.S. Pat. No. 4,070,543, U.S. Pat. No. 4,444,447, and U.S. Pat. No. 4,764,125, the disclosure of each of which is incorporated herein by reference.

The invention is further illustrated with reference to the accompanying drawings, in which FIGS. 1A and 1B show two perspective views of an electrical connector of Z-shaped cross-section;

Figure 6A:
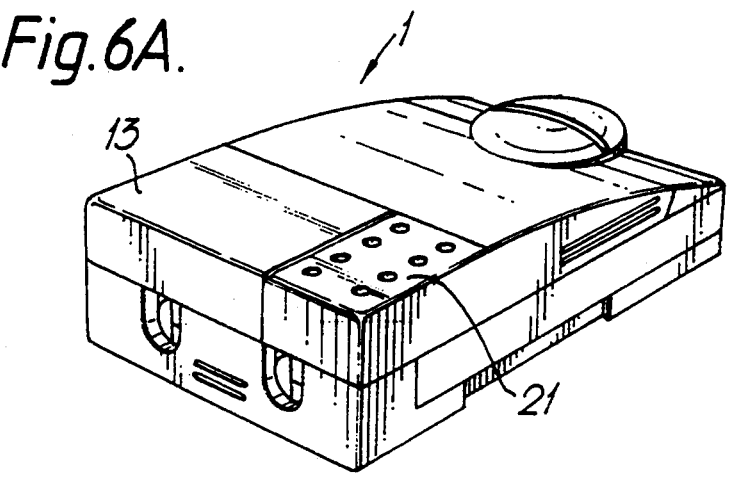
Figure 6B:
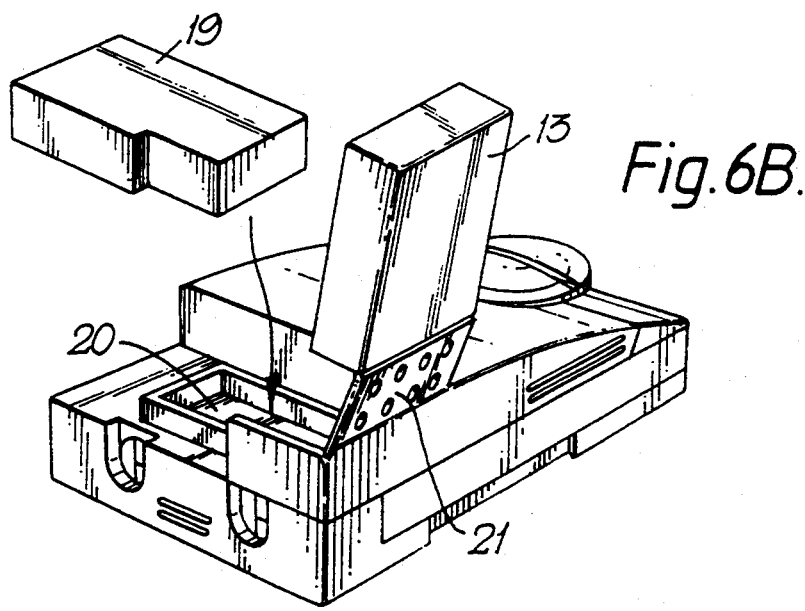
Figure 6C:
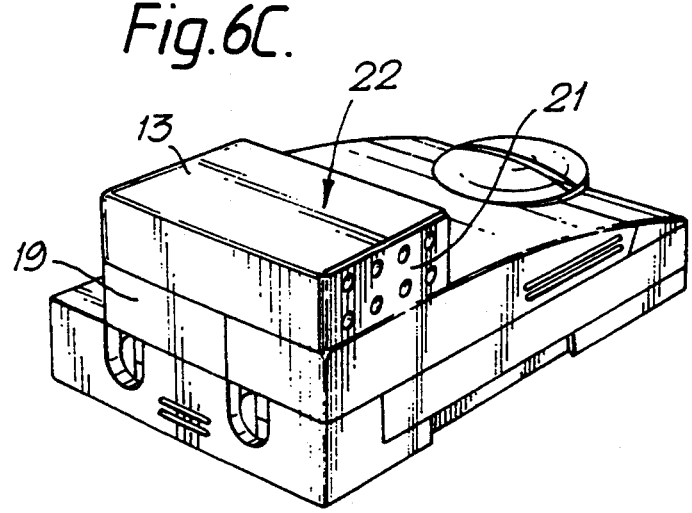
Figure 7:
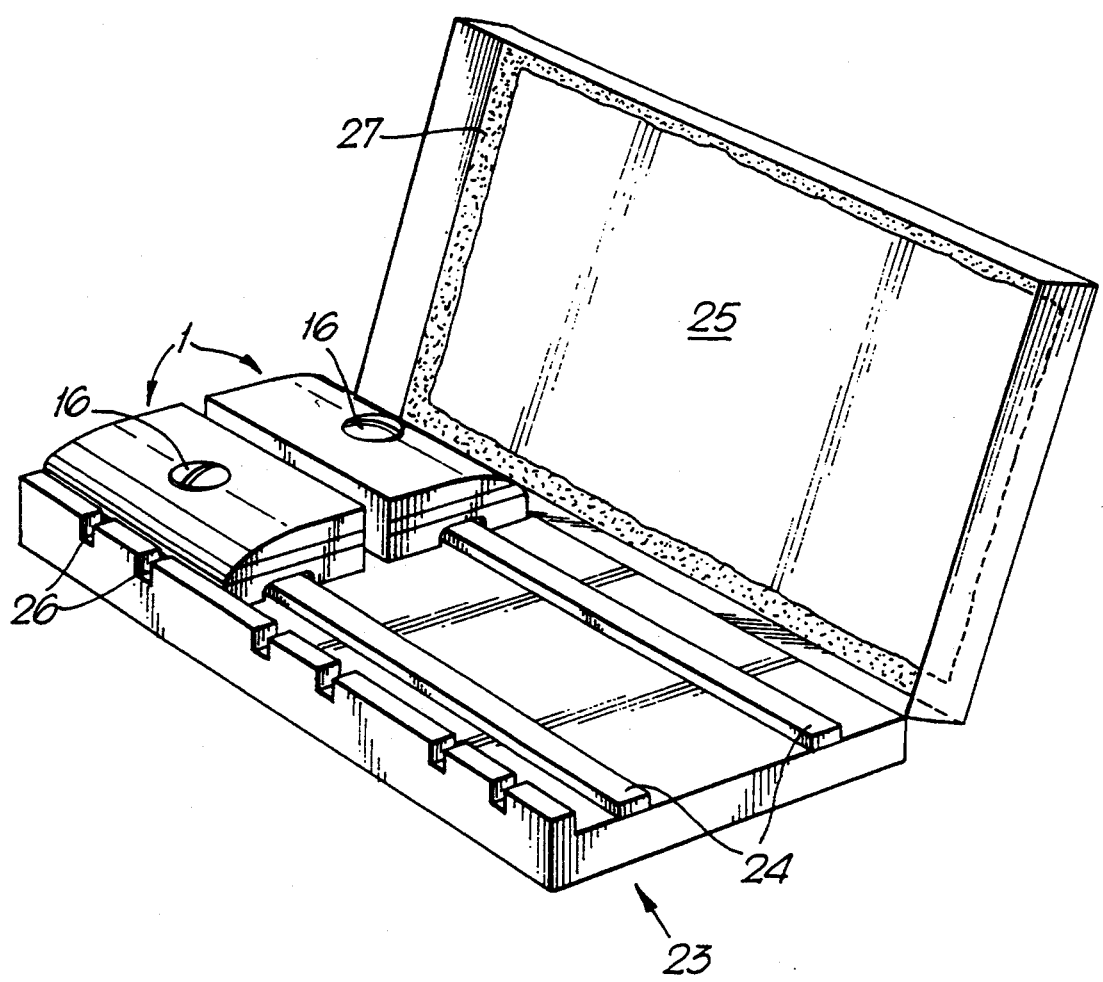
Figure 8:
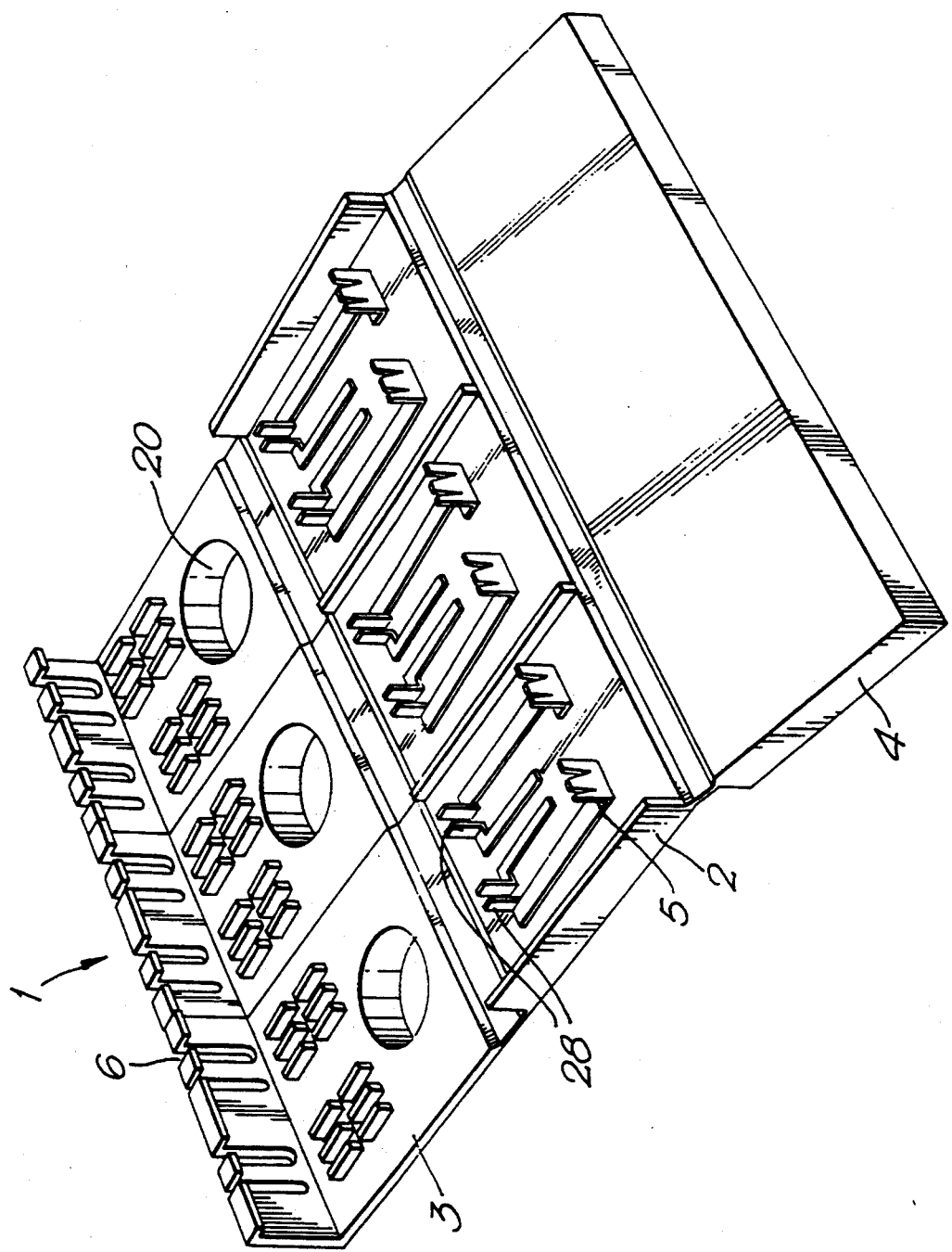
Figure 12:
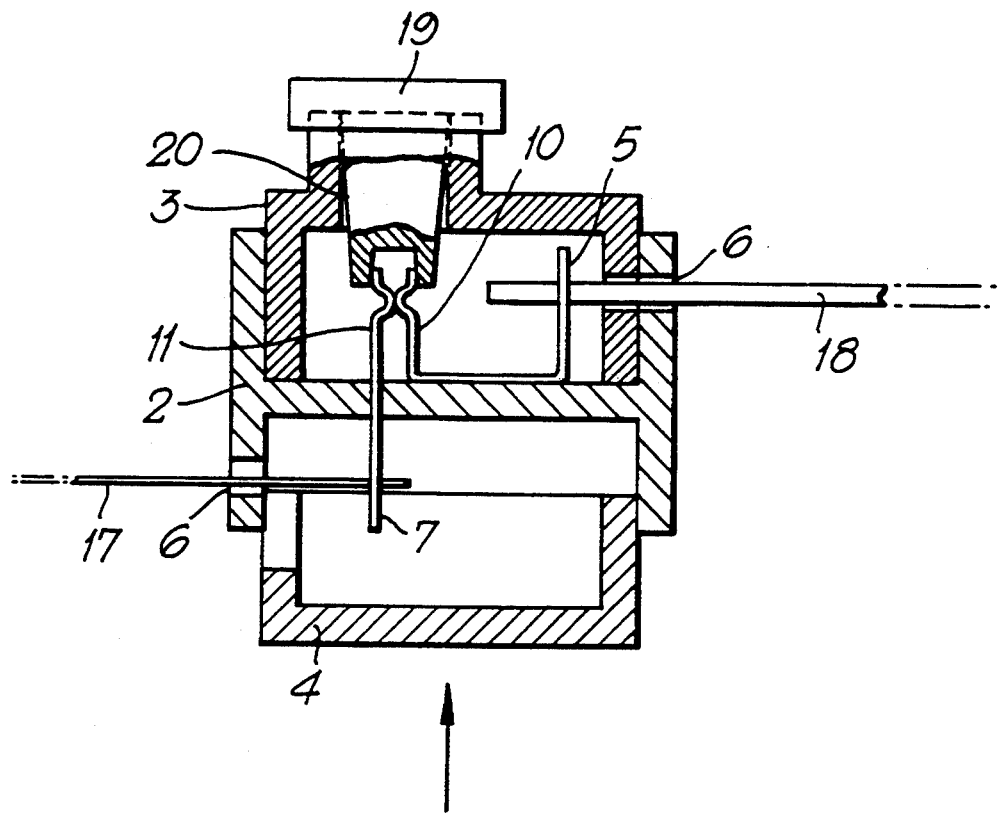

FIGS. 4A, 4B, 4C 5A, 5B, and 5C show ways in which connectors can be used to join conductors;

FIGS. 6A, 6B and 6C show the installation of a protection module into a connector;

FIG. 7 shows a casing on which connectors may be mounted;

FIGS. 8, 9, 10 and 11 show other designs of connector;

FIG. 12 shows a connector whose parts slide with respect to one another, and

Figure 13A:
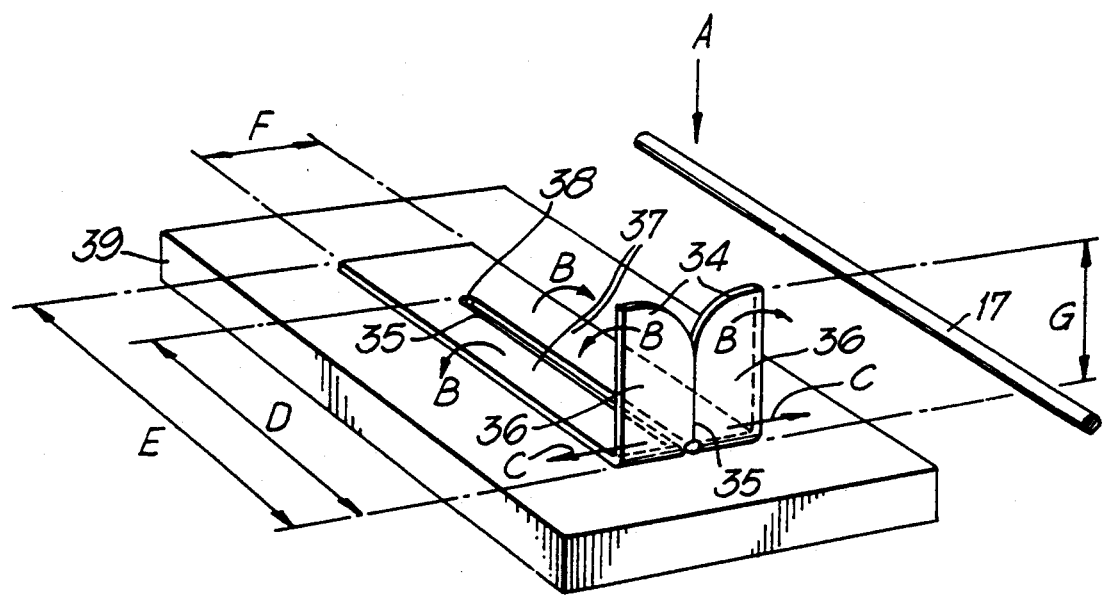
Figure 13B:
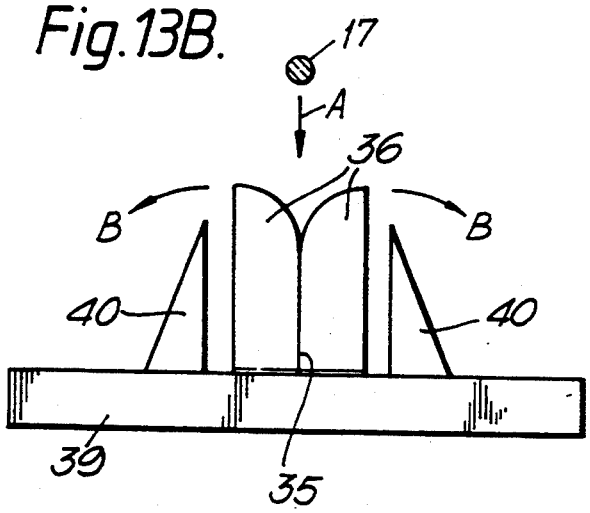

FIGS. 13A and 13B show an insulation-displacement connector.

Figure 1A:
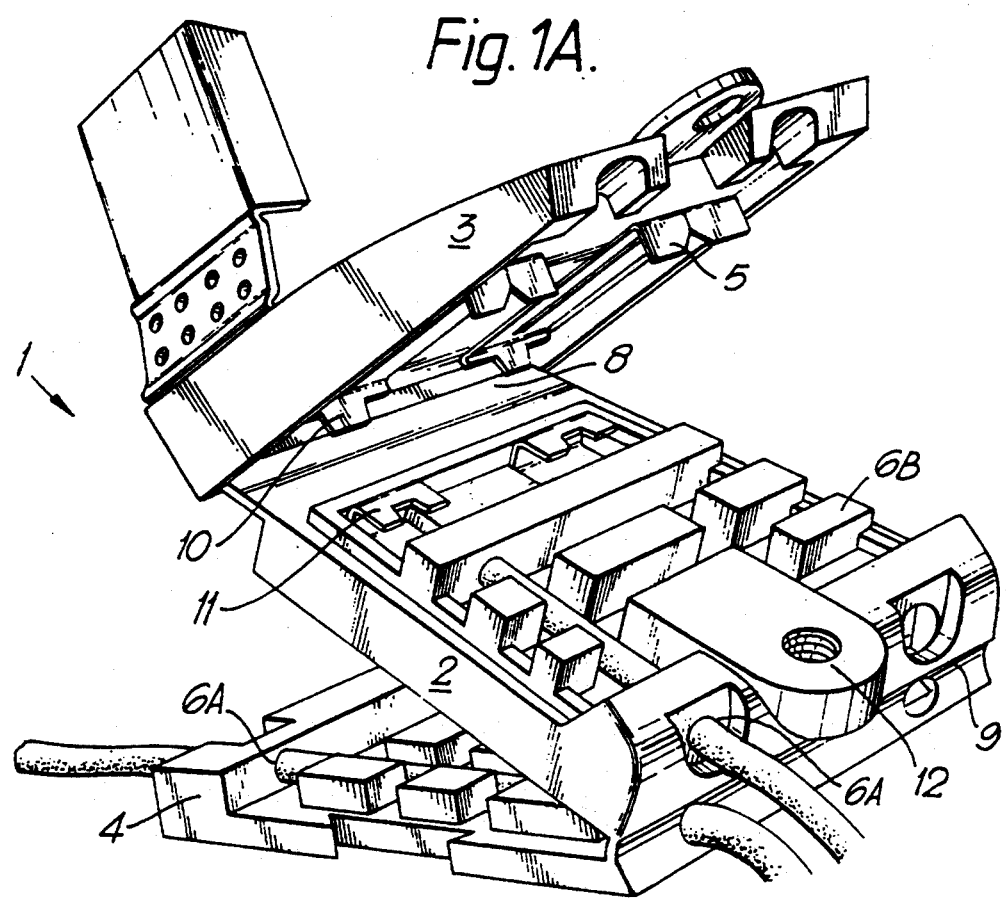
Figure 1B:
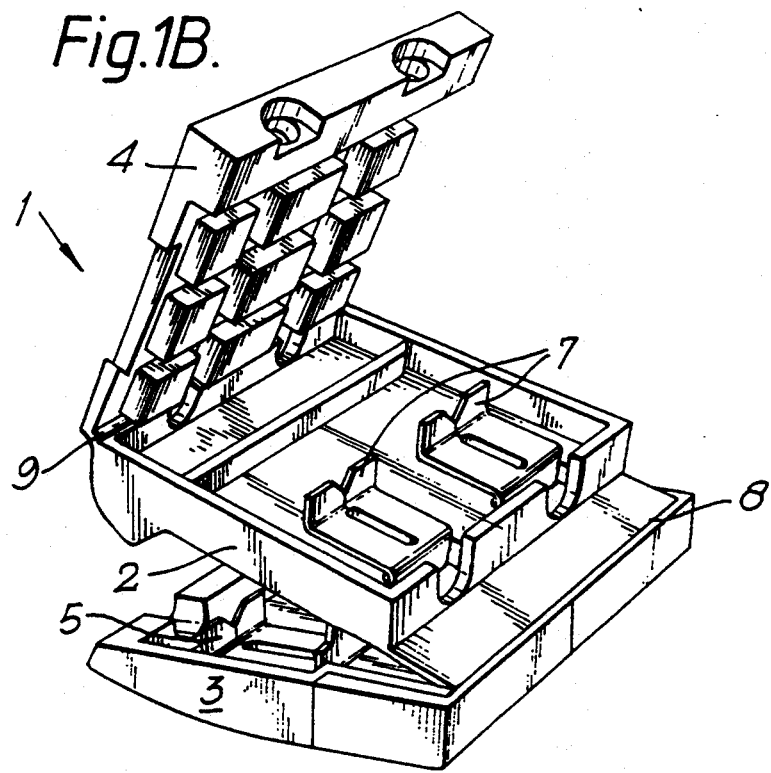

FIGS. 1A and 1B show an electrical connector 1, of substantially Z-shaped configuration in cross-section, and used to connect together electrical conductors such as telephone wires. FIG. 1A is a view from above and FIG. 1B is a view from below. Since telephone lines employ pairs of conductors, the connector will in general have one or more pairs of contacts etc. In the following discussion, however, connection of single wires will be referred to for simplicity.

The connector has a first part 2 and a second part 3 pivotable about its rear edge as drawn, thus allowing opening and closing of a space between them. A third part 4 is pivotable about a front edge of the first part 2, similarly to allow opening and closing of a space between then. In general, the first and/or second and/or third parts will be at least partially hollow. The spaces may contain first and second insulation-displacement or other connectors 5 and 7, carded preferably by the second and first parts 3 and 2. Such connectors obviate the need for conductors to be pre-stripped at their ends. One or more of the parts (preferably the first and third parts) has means for locating a conductor which may, for example, comprise a hole or recess 6A in an outer surface and/or a protrusion or other guide 6B within the space between the parts. The parts may pivot about hinges or other means 8 and 9. Living hinges, preferably integral with the parts 2, 3 and 4, are preferred.

The first insulation-displacement connector (IDC) is electrically connected to, and preferable is integral with, a first electrical contact 10. The first part 2 carries a second electrical contact, which is electrically connected to, and preferable integral with, the second IDC, 7.

When the first and second parts 2, 3 are closed by pivoting along line 8, the first and second electrical contacts 10, 11 are brought together. They therefore constitute a switch within the connector housing. The result is that the two IDCs 5,7 become electrically connected, thereby joining any conductors carried by them. In this way the connection (say between central office and subscriber) may be made and broken, and if need be the connector may be open and closed without IDC connections being disturbed.

This electrical connection between the contacts 10, 11 may be direct, or it may require some further component such as an overcurrent protector between them. In this sense, the connection may be said to be "capable of being made" when the parts 2 and 3 are brought together.

The action of bringing together the first and second parts 2, 3 (or the first and third parts 2, 4) may also drive a conductor into the IDC 5 (or 7). This may require a significant force and means may be provided for moving the parts to close the housing of the connector. Such means may comprise a bolt that passes through the second (or third) pan into a nut 12 in the first part 2. The terms "nut" and "bolt" are used herein in a broad sense to include any female/male connector where some turning motion is involved, and includes screws, cams and bayonet fixings. An alternative is an over-center latch or other lever-action device.

The housing of the connector may have a cover 13 for enclosing an access point to the first and second contacts 10, 11, or other component within the housing. Such an access point may allow for testing of the contacts (for example to determine line voltage or continuity in both or either direction) or for addition of other electrical components. Other electrical components may comprise electrical protection such as the overcurrent protector mentioned above (in series between-the contacts) and/or an overvoltage protector between one or both contacts and ground. A further use of the access point may be for tapping-off to further telephones, or other telecommunications equipment. Due to the various uses of the access point, it may be referred to as a "flexibility point", providing the connector with increased versatility.

The access point is preferably environmentally-sealed to protect the contacts 10, 11 or other parts of the connector. Such sealing may be provided by a cover 13 and/or by a sealing material such as a gel, particularly one having the following properties: a cone penetration from 100–400, especially 150–350, particularly 250–350 ($10^{-1}$ mm), an ultimate elongation of at least 100%, particularly at least 300%, especially at least 500%, a maximum tensile strength of substantially 20 p.s.i, an elastic modulus of less than $10^7$, especially $10^6$, particularly $10^5$ dynes/cm$^2$, and a cohesive strength greater than its adhesive strength to components of the connector. Cone penetration is determined in accordance with ASTM D217-68, (cone weight 102.5 g, shaft weight 47.5 g), and elongation in accordance with ASTM D638-80.

The sealing material may be prepared by extending a polymeric material with a vegetable and/or mineral oil. The resulting material may be thermoplastic, or it may be formed by cross-linking the polymeric material. The polymeric material may comprise a block copolymer, for example one having crystalline end blocks and elastomeric centre blocks. An example is a styrene-ethylene butylene-styrene block copolymer, for example that known by the trade mark KRATON G1651. Such a material may be used with from 700–1200, particularly 900–1100 parts by weight of plasticizing oil to 100 parts of a block copolymer. Other gels can be made based on oil-extended polyurethanes or silicones.

The spaces between the parts are preferably at least partially filled with such a sealing material, preferably in sheet form. Means, such as a spring, is preferably provided for maintaining and optionally for putting the sealing material under compression.

A device, such as an electrical-protection device, that is applied at the access point is referred to herein in preferred embodiments as a "plug" and a part of the housing that receives it as a "socket". These terms are used in a broad sense with reference to the functions of the plug and socket and their relative sizes: whilst we prefer that the plug has male electrical contacts, and the socket female, the situation could be reversed. Also, the second (or other) part of the housing may have a recess within which the plug is at least partially received, but this is not necessary.

Where the plug is to provide overvoltage protection it will, in general, need to be electrically connected to ground. In this way, it can shunt any overvoltage caused for example by lightning or mains voltage cross away from equipment connected by the connector, and down to ground. The protection device will remain insulating at the normal operating voltages of the conductors, but will become conducting at the higher fault voltage. A ground connection may be provided within the connector housing and that may be in turn connected to some casing to which the connector is attached. A bolt that closes the part of the housing, and that mates with nut 12 may be in electrical contact with electrical ground. The protection plug may make contact with the head or other part of the bolt. A connector housing of slightly different design from that illustrated may then be preferred, so that the bolt and contacts 10, 11 are closer together and such that a plug and cover 13 cover both.

The IDCs 5,7 are shown as split beam connectors, and they are more fully illustrated in FIG. 13. Their beams are bent at their split between proximal and distal ends. As a result when a conductor is inserted into a slit, the connector, which is preferably resilient, is deformed against its resilience, the mode of deformation varying with extent of insertion. Also, energy is stored over a large extent of beam. As a result an IDC of small absolute size, and especially of small size perpendicular to the plane of the conductors, is able to accept conductors over a large range of sizes.

The connector may be provided with strain relief for the conductors, and/or means for cutting the conductors to length especially on closing of the parts.

Figure 2:
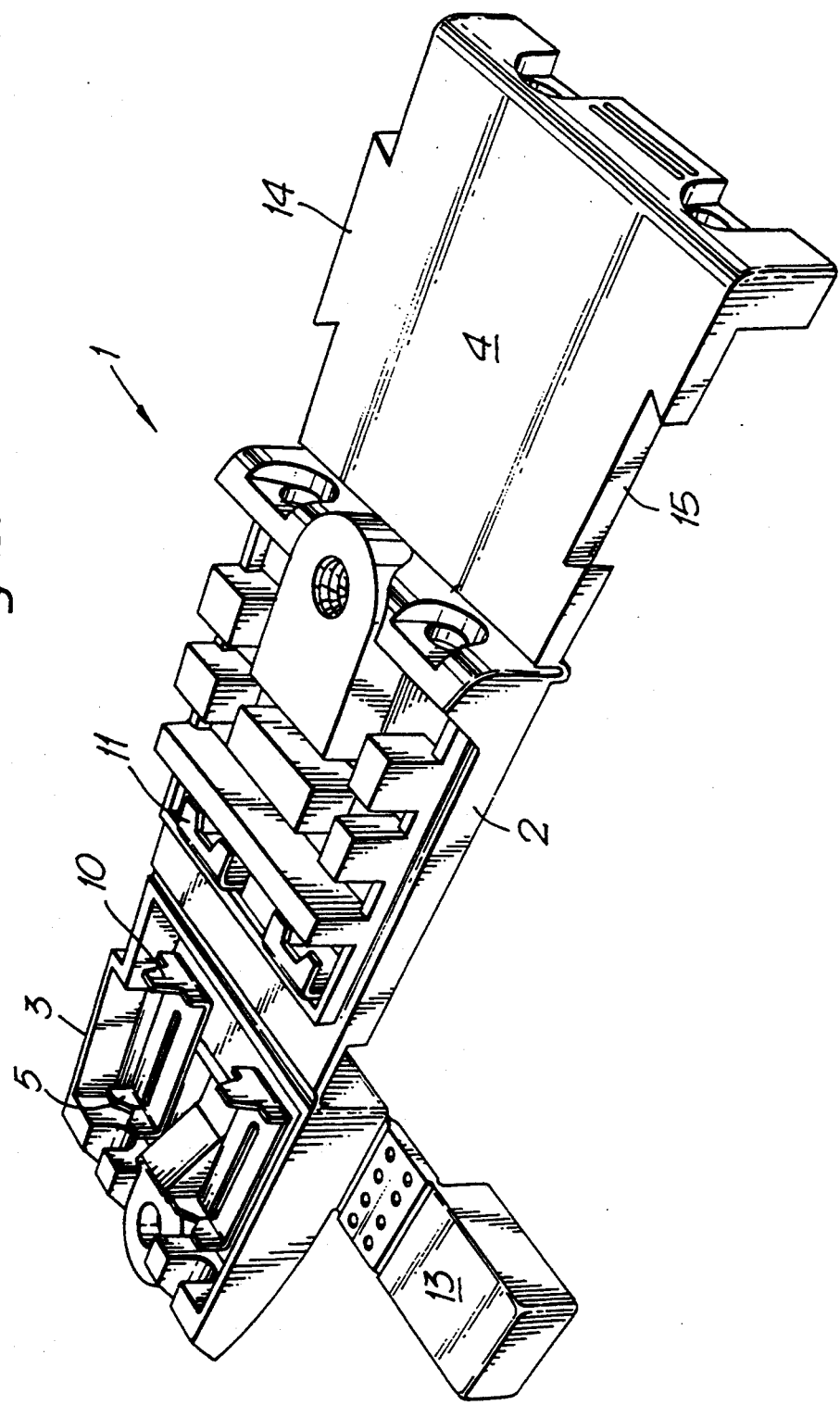
FIG. 2 shows the connector of FIG. 1 in unfolded form.

FIG. 2 shows the connector 1 of FIG. 1 unfolded such that it lies substantially flat. Preferably the three parts 2, 3, 4 are integral with one another, the part being manufactured by moulding, for example injection moulding. Preferred materials include polypropylene (useful for living hinges) and or various engineering plastics.

The third part 4 (or other part) may be provided with complementary joining means such as dove-tail protrusion 14 and recess 15 whereby a connector can be joined side-by-side to a similar connector.

Figure 3:
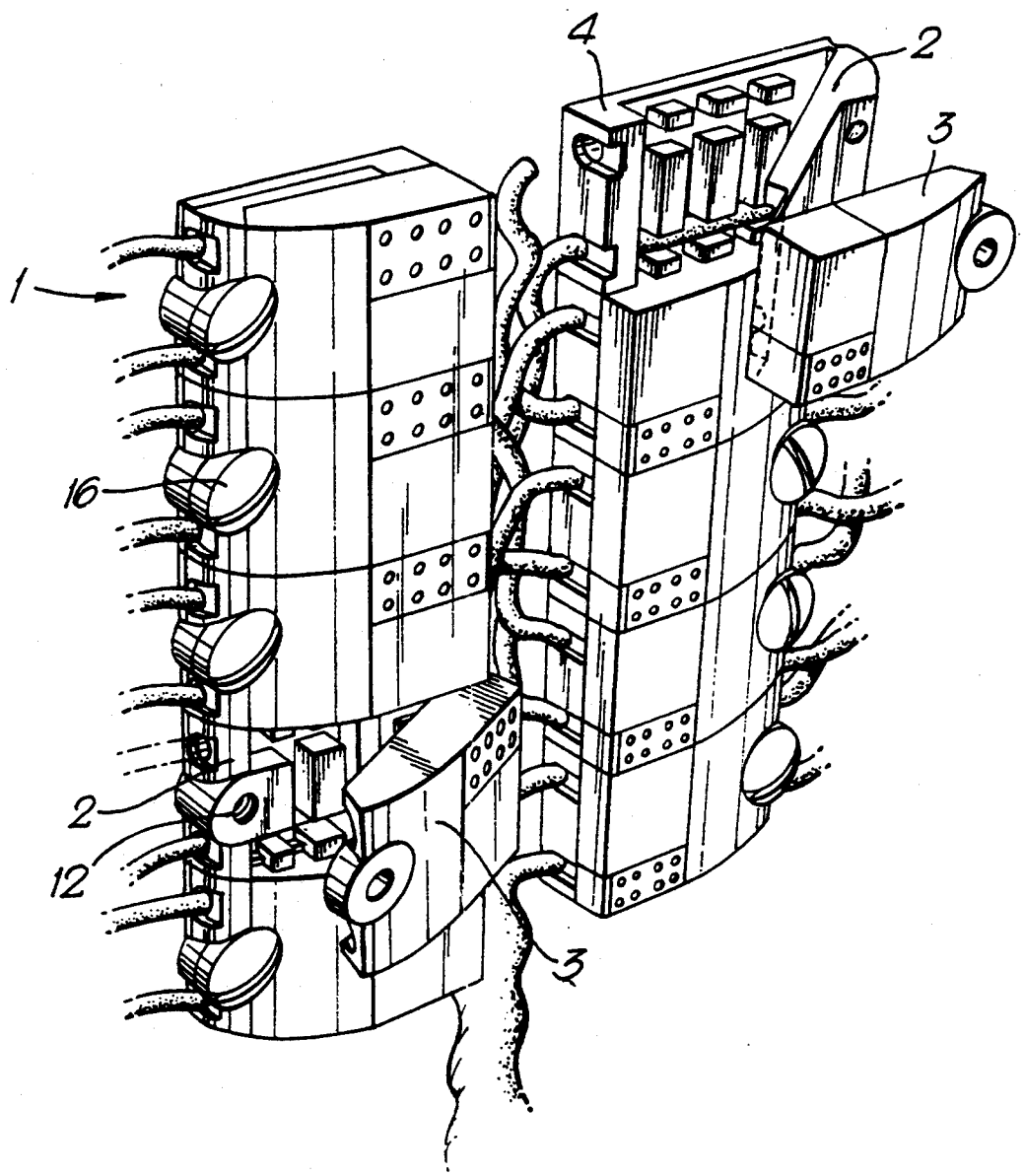
FIG. 3 shows several connectors positioned together to form a terminal block.

FIG. 3 shows several such connectors joined side-by-side. Bolts 16 are shown having been used to bring or maintain together various parts of the connectors, and optionally to provide ground connections.

FIGS. 4A, 4B, 4C 5A, 5B, and 5C show two ways in which the connectors 1 can be used to join conductors 17 and 18. The third part 4 acts as a base (hence the use of that part in FIG. 2 for interconnection of adjacent connectors) which may be secured to some casing etc. An insulated conductor from, for example, a telephone central office, is placed in some means for location 6 of the third part 4. This is shown in FIG. 4A. The third part 4 and first part 2 are then closed as indicated by the arrow, causing an IDC on the underside of the first part to cut through insulation of the conductor 17 and make electrical contact.

Then a further insulated conductor 18 leading to, for example, a subscriber, is placed in means for location 6 on the upper surface of the first part 2. See FIG. 3. The second part 3 is then closed as shown by the arrow, causing an IDC in the first part to make connection to conductor 18. When the second part is closed, the two IDCs make contact with each other, to connect together the conductors 17 and 18, as shown in FIG. 4C.

FIG. 5 is similar except that in FIG. 5B means for location is provided at the lower surface of the second part 3, and an IDC is provided on the upper surface of the first part 2.

FIGS. 6A, 6B and 6C show three steps in the provision of an electrical protection device, or other plug, in a connector.

FIG. 6A shows a connector 1 having a cover 13 that is shown closed. In FIG. 6B it is open and a plug 19 is about to be mated with socket 20. FIG. 6C shows the plug, now inserted, covered by the cover which has been folded over it. The cover has a first surface 21 that is now vertical (as drawn) and a part 22 that is now horizontal and covers the top of the plug. In this way a cover 13 is provided that can seal socket 20 when empty, and also can seal plug 19. Thus, the connector can be used with full environmental sealing with or without the plug.

A casing 23 is illustrated in FIG. 7, within or on which are mounted a plurality of connectors 1. Two are shown but more, such as 10, 25 and 50 may be provided. The casing plus connectors may be positioned in or adjacent a cable splice case, or other housing such as a cross-connect cabinet or a pedestal, and it may be positioned at ground level, on a pole, suspended from a wire or attached to a wall etc. The casing 23 may provide a sealed housing or it may comprise merely a frame or other support.

The casing 23 illustrated has rails or guides 24 over which connectors 1 are positioned. The rails 24 may be electrically conductive and connected to ground, thus providing means for grounding some component within the connectors. The bolts 16 may mate with the rails 24. The casing may have a cover 25 and locating means 26 for the incoming or outgoing conductors. Sealing material 27 may seal the cover to the base.

FIGS. 8, 9, 10 and 11 show other designs of connectors, each having first, second and third parts 2, 3, and 4 that hinge together. The designs illustrated are for three pairs of conductors. Two IDCs 5 are provided for each pair (shown) above and (hidden) below the first part 2. A protection plug extends through socket 20 to connect together the contacts 28, optionally via an overcurrent protector and/or to connect either one of them to ground via an overvoltage protector. One of the contacts 28 is integral with the visible IDC 5, and the other extends through the plane of the first part and is integral with the hidden IDC.

FIG. 9 shows a drop cable 29 containing three pairs of conductors 30, located in the third part, 4. When the third part 4 is folded over the first part 2, the conductors are driven into the IDCs 5. A single third part 4 provides for several (here three) pairs of connections.

An opposite side of such a connector is seen in FIG. 10. Individual second parts 3 are provided for each pair of connections. A ground plate 31 is shown below the base of the connector. A bolt for driving the part together may be provided, and it may mate with the plate 31.

In FIG. 11 slabs or other sheets of a sealing material 33 are provided between the parts 2, 3 and 4 of the connector. The sheets 33 may be positioned between respective pairs of parts after the conductors have been positioned. Alternatively, the connector may be supplied with a sheet 33 preinstalled at one or more of the appropriate surfaces of the parts. The sealing material preferably substantially fills any space between the parts. Also, it preferably contacts all otherwise exposed connectors or other metal-work within the connector. In this way an excellent environmental seal can be achieved. In less damaging environments, a mere seam seal of sealing material may be sufficient, provided around or adjacent peripheries of the parts 2, 3 and 4. Each pair of parts is preferably re-openable, and if a suitable sealing material is used removal and reconnection of central office as well as subscriber conductors is possible. The sealing material preferably comprises a gel such as that mentioned above. Means, such as a spring, is preferably provided for maintaining, and optionally for putting, it under compression. An expansion cavity may be provided into which sealing material may pass on closing the parts and/or on insertion of a conductor.

FIG. 12 shows a connector 1 having first, second and third parts 2, 3 and 4 that slide together, preferably telescopically, rather than pivotally. A connector may be provided that combines at least some of the features of a pivoting design and at least some of the features of a sliding design.

A conductor 17 from a telephone central office etc passes through a locating means 6 such as a hole in a wall of the first part 2. When part 4 is slid in the direction of the arrow into, over or otherwise with respect to part 2 the conductor 17 is driven into IDC 7.

A subscriber drop wire 18 is located in means 6 of the first part 2 and is likewise driven into IDC 5 by sliding the part 3 into, over or otherwise with respect to part 2. Contacts 10 and 11, which are connected to (and preferably integral with) IDCs 5 and 7, are themselves connected together by plug 19 on insertion thereof into socket 20. As mentioned in connection with the designs above, plug 19 may connect contacts 10, 11 via an overcurrent protector and/or may connect either of them to ground via an overvoltage protector.

A bent IDC 5 is shown in FIG. 13A. The IDC is of the splitbeam type having beams 34 and a slot 35 between them. The IDC preferably comprises a phosphor-bronze or beryllium-copper alloy. In particular, IDCs (especially those for incoming wires from a central office) comprise a 0.5 to 0.75 hard phosphor-bronze C51000 or C51900 which are nominally Cu-Sn5 and Cu-Sn6. Such materials have good elasticity without excessive stress-relaxation. IDCs for drop wires to subscribers, which may be reentered more often, may have more stringent requirements of elasticity, ductility (allowing sharp bends) and hardness. The material preferably has a yield stress of at least 300, especially 350 MPa, and is preferably hard enough to deform bronze and steel wires. If its conductivity is not sufficient, it may be plated. The drop IDC preferably comprises Cu-Sn8 C52100 hard, Cu-Sn10 52400 hard, Cu-Sn5 C5100 hard or Cu-Sn6 C51900 hard. In general, we prefer a modulus of 90000–140000, especially about 110000 MPa, and a tensile strength of greater than 400 especially 450 MPa. The ductility preferably allows the material to be bent at a radius of the material thickness, or greater than 5%. Hardness is preferably at least 70, especially 72 Rockwell B. An example of a beryllium-copper alloy is C17200, which may require hardening by heat treatment. A spinoidal alloy such as Cu-Ni-Sn C72700 may be suitable. The beams 34 at the split 35 are bent between a distal end and a proximal end thereof. Thus, the slit extends as it were around the bend. Preferably the beams have a substantially planar first part 36 distal of the bend and a substantially planar second part 37 proximal of the bend. The slit may terminate at a cut away portion 38 to avoid stress concentration. The IDC is shown mounted on a support 39. On insertion of conductor 17 into the slit 35 as shown by arrow A the initial deformation of the beams will be predominantly as shown by arrows B. This involves torsion of the proximal parts 37 as shown. As the conductor advances in the slot 35 between the distal parts 36 the mode of deformation will vary to become predominantly bending of the proximal parts 37 as shown by the arrows C.

The length D of the second part is preferably 10–20, particularly 12–16, especially about 14 mm, and that (E) of the whole horizontal part is preferably 25–30 mm. The width F of the IDC is preferably 5–10, especially about 8 mm, the slit being preferably 2.5–4.5 mm at the second part and sharpened edges of the beams preferably substantially touching one another at the distal part 36. The length G of the distal part is preferably 6–14, especially 8–12, particularly about 10 mm. Preferably, the length D is from 1.2–1.6, particularly about 1.4 times the length G. The material thickness of the IDC will typically be from 0.8–1.2, especially about 1 mm.

FIG. 13B is an end view of an IDC of the type shown in FIG. 13A. Here, however, the IDC is provided with stop means 40 which may be part of a support 39 or a connector housing. Stop means 40 serves to limit free deformation of the IDC. Thus, for larger conductors some deformation of stop means 40 will additionally be required, thus increasing the force exerted by the IDC on the larger conductors.

For the avoidance of doubt it is noted that the invention provides an improved connector, IDC, connection block and method of connection. Any of the connectors, IDCs, contacts, housing or casing designs or protector designs may be selected.

We claim:

1. An electrical connector, which comprises
   (a) a housing comprising a first part and a second part that can be moved relative to one another,
   (b) an electrical protection device carried by the first part and being electrically-connectable to a first electrical contact that extends within the housing,
   (c) a second electrical contact within the housing that has means for connection thereto of an electrical conductor, the first and second electrical contacts being arranged such that connection is made between them on closing the housing and connection between them is broken on opening the housing.

2. An electrical connector according to claim 1, in which said means for connection is operative when the housing is closed and inoperative when the housing is open.

3. An electrical connector according to claim 1, in which the means for connection comprises an insulation displacement connector.

4. An electrical connector according to claim 1, in which the electrical protection device provides overvoltage protection and is connected between said first contact and an electrical ground of the connector.

5. An electrical connector according to claim 1, in which the electrical protection device is electrically-connectable to a third electrical contact that extends within the housing and that has means for connection thereto of an electrical conductor.

6. An electrical connector according to claim 5, in which the electrical protection device connects the first and third contacts via an overcurrent protector.

7. An electrical connector according to claim 6, in which positioning of the electrical protection device at the first part breaks a direct electrical connection between the first and third contacts.

8. An electrical connector, which comprises (a) a housing that has means for receiving an electrical protection device, (b) a first electrical contact having means for connection to a first electrical conductor, (c) a second electrical contact having means for connection to a second electrical conductor, (d) means for the first and second contacts to be in direct electrical contact in the absence of the protection device, and (e) the protection device, which when received in the housing, interposing an overcurrent protector between the first and second contacts.

9. An electrical connector according to claim 8, which additionally comprises (e) an electrical ground, the protection device, when received in the housing, interposing an overvoltage protector between the first and/or second contacts and the ground.

10. A connector block comprising a plurality of connectors according to any preceding claim.

11. A connector block according to claim 10 further comprising a connector block casing.

* * * * *